Oct. 3, 1967  W. V. MORRIS  3,344,870
REAMER FOR JET PIERCER
Filed March 19, 1965  6 Sheets-Sheet 1

WILFORD V. MORRIS
INVENTOR.

BY Roy H. Smith, Jr.
ATTORNEY

Oct. 3, 1967  W. V. MORRIS  3,344,870
REAMER FOR JET PIERCER
Filed March 19, 1965  6 Sheets-Sheet 3

WILFORD V. MORRIS
INVENTOR.

BY Roy H. Smith, Jr.
ATTORNEY

Oct. 3, 1967  W. V. MORRIS  3,344,870
REAMER FOR JET PIERCER
Filed March 19, 1965  6 Sheets-Sheet 4

WILFORD V. MORRIS
INVENTOR.

BY *Roy H. Smith, Jr.*
ATTORNEY

Oct. 3, 1967  W. V. MORRIS  3,344,870
REAMER FOR JET PIERCER
Filed March 19, 1965  6 Sheets-Sheet 5

WILFORD V. MORRIS
INVENTOR.

BY Roy H. Smith, Jr.
ATTORNEY

Oct. 3, 1967  W. V. MORRIS  3,344,870
REAMER FOR JET PIERCER
Filed March 19, 1965  6 Sheets-Sheet 6
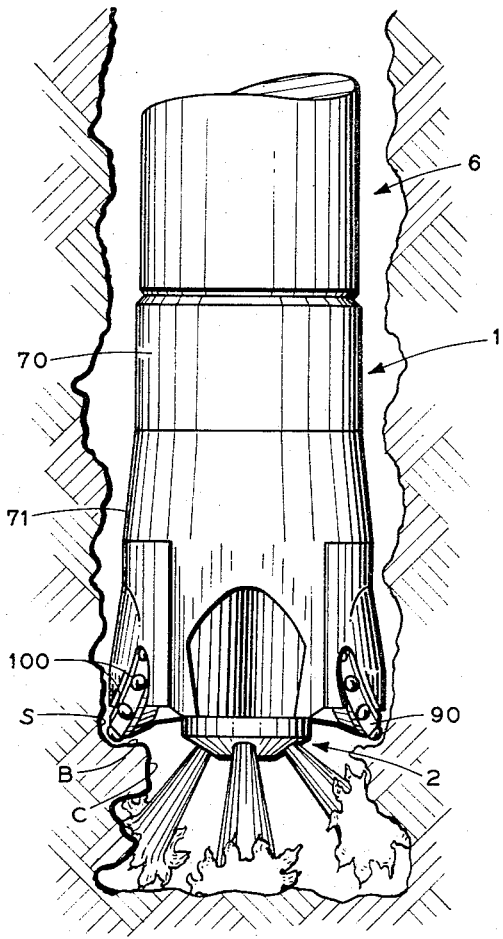
FIGURE 11
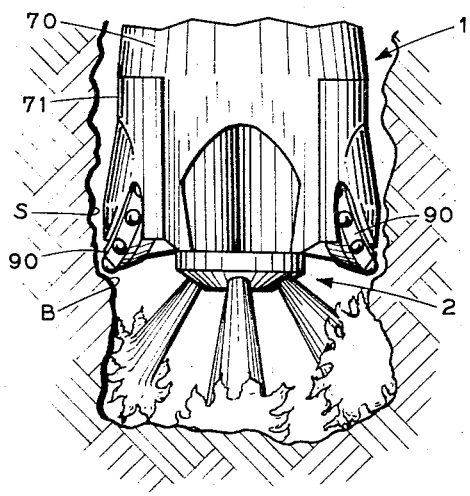
FIGURE 11-A
WILFORD V. MORRIS
INVENTOR.
BY Roy H. Smith, Jr.
ATTORNEY 3,344,870
REAMER FOR JET PIERCER
Wilford V. Morris, Houston, Tex., assignor to Hughes Tool Company, Houston, Tex., a corporation of Delaware
Filed Mar. 19, 1965, Ser. No. 441,131
7 Claims. (Cl. 175—15)

ABSTRACT OF THE DISCLOSURE

A reamer in the form of a cylindrical shell body which surrounds a jet piercer or blowpipe and has at its lower end a number of circumferentially spaced recesses each of which accommodates a bearing pin secured to the reamer body and a rolling cone cutter journaled on the pin. Such cutters are disposed slightly above the lower end of the blowpipe, and are spaced around the periphery to lie approximately midway between adjacent flame ports of the blowpipe. The cutter has the well known doubly conical surface contour, a gage surface and a bottom cutting surface extending in opposite directions from a common base. The blowpipe disintegrates the rock at the center of the hole while the rolling cones cut the rock collar at the outer portion of the hole bottom.

The main problem in developing a durable cutter and reamer was in the furnace-like atmosphere engendered by the hot blast from the blowpipe, an atmosphere which rapidly decarburizes and softens steel cutters, thus causing the alloy steel teeth and bearings to wear so rapidly that prior art steel cutters could not be used and even the use of inserts of tungsten carbide appeared to be impossible. The inventor found that cutting structure in the form of a single row of heel inserts of cemented tungsten carbide would solve the problem, but only when such inserts were about 50% longer in axial length than heretofore, and were seated in holes in the rolling cutter which are also about 50% deeper than those known before. He also discovered and exploited an "external bearing" between his cutters and the body of the reamer, a discovery made possible by the fact that the bulk of the bottom cutting surface of the cone is a smooth surface and can rub against the reamer body without digging into it and binding and stopping. This external bearing comes into play when the journal bearing between the pin and rolling cutter becomes partially worn away, and arrests further such wear so successfully that the cutters may be used until completely dulled.

---

The present invention lies broadly in the field of earth penetrating tools, and more specifically earth penetrating tools operating in part by the direct application of heat to the surface of a mineral bed in which a hole is being formed. Even more specifically, the invention concerns an improved reamer to be mounted exteriorly of a blowpipe burner to assist the burner in making a hole by cutting that portion of the bottom lying adjacent the intersection of the bottom with the sidewall of the hole, by maintaining a minimum gage in such hole, or both.

Heretofore jet piercers, also known as blowpipes, flame drills or thermal drills, have combined a central burner, in which a fuel such as kerosene is burned and the explosion gases directed through orifices to the bottom of the hole, with a reamer in the form of a cylindrical shell surrounding the burner and rigidly secured to it, such shell usually having raised teeth extending axially along the outer surface of the shell and radially beneath it. This assembly is rotated slowly while the flaming gases jet from the orifices of the burner onto the rock to be removed, and for many types of rock the burner does the complete job. Such rocks fail through fragmentation and spalling brought about by the intense, localized heating from the hot and flaming gases, and the resulting fragments are carried to the surface by the escaping gases. This result apparently obtains because the rocks are heterogeneous in nature, and the divers constituents have different rates of thermal expansion. As each constituent tries to expand at it own peculiar rate, stresses are set up which can only be relieved by spalling and fragmentation.

Frequently, however, a more homogeneous rock formation is encountered which is not readily amenable to failure by heat alone, e.g., layers of intrusions in iron ore formations such as taconite. Such rock, rather than fragmenting and spalling, fuses and resolidifies, or otherwise resists the heat to form an irregular ring or collar of hard rock generally centered on the axis of the hole and solidly secured to the sidewall. Heretofore this collar has been removed by the solid type reamer above mentioned, the cutting teeth of the reamer dragging or scraping the rock collar in the manner of a fishtail bit. Such reamers have proven unsatisfactory in service, as they wear out quickly even when composed of the best known combinations of materials to impart strength and wear resistance, and despite the fact that a flow of coolant is provided against the intense heat to which they are exposed. They are also very slow, as they operate essentially by the slow process of abrasion, and suffer the further disadvantage that the lowermost parts of the reamer are continuously exposed to a quite high heat.

It is the object of the present invention to provide an improved reamer for a jet piercer which will last longer in service than the reamers of the prior art, one which will rapidly disintegrate the hard rock collars encountered in thermal drilling. Another object is to furnish such a reamer which will enable the jet piercer on which it is mounted to drill faster than has heretofore been possible.

In connection with the above discussion of removing rock collars, note should be taken of the fact that in some types of rock formation the collar can be removed by burner action alone, but only at a big sacrifice in drilling rate. In such formations the molten rock apparently becomes so thin that the liquid is picked up as drops and carried to the surface by the combustion gases, but this result obtains only when the burner is held still, or is advanced at a snail's pace. Prior art scraping type reamers have not increased the drilling rate as much as desired when such collars are formed, and it is an object of the present invention to increase the drilling rate of a jet piercer by furnishing a reamer which destroys rock by chipping and crushing rather than scraping, and thus increases the drilling rate of the tool.

Another object is to provide a reamer which will operate effectively to maintain a minimum gage of borehole, particularly so since it has been found that in some rocks collar formation is prevented in the area below most of the reamer (as well as the burner) if the reamer thus maintains gage, the net result being that the reamer does essentially all of its work at the very intersection of the sidewall and bottom.

An allied object is to provide such a reamer having a reasonably limited overall radial dimension, for it is believed to be apparent that to a large extent the reamer is simply making room for its own downward passage and it would be wasted effort if a large radial dimension necessitated drilling an oversize hole.

These objects are achieved in the present invention by abandoning the scraping type reamers of the prior art in favor of a rolling cutter type of reamer in which the cutting structure on the outer surface of the rolling cutters consists of inserts of a wear resistant material, e.g., sintered tungsten carbide, secured in sockets in the body of the cutter so that the cutting tips on the outer ends of the inserts protrude from the cutter to disintegrate the rock collar. Such rotating cutting structure is so incorporated in the overall jet piercer configuration and disposition that each portion of the cutter passes only once through a hottest zone during each revolution, and thereafter passes through zones of lower ambient temperatures during which it is cooled to remove its recently acquired heat, the result being to present continuously cooled cutting structure to the hottest part of the formation at the bottom of the hole.

It is preferred to use wear resistant inserts rather than integral steel teeth because the cutting structure of the reamer must combine the characteristics of wear resistance to give it long life in the abrasive rock usually encountered, heat resistance to preserve its cutting ability in the furnace-like atmosphere engendered by the burner, and sufficient toughness to avoid internal chipping and spalling. Materials like sintered tungsten carbide are much more resitant to wear and heat than the hardest steels, and can be so formed and disposed as to minimize chipping.

Although tungsten carbide inserts have been traditionally used with blunt cutting tips which form blunt indentations in rock of high compressive strength and fracture such rock more by crushing it rather than by tearing and gouging it, in the present application the cutting tips may have a wide variety of shapes, e.g., those disclosed in the co-pending application of A. D. White, S.N. 380,365, filed July 6, 1964, now abandoned. Such latitude is possible because the rock in the collar to be disintegrated is so softened by the burner heat that its compressive strength does not pose a great problem. The blunt cutting tips shown in the attached drawing are preferred, however, because they are less subject to chipping and breaking than inserts having sharper ends. A possible substitute for tungsten carbide inserts is steel teeth or lugs or inserts covered with a thick wear-resistant hardfacing, the combination defining wear resistant cutting members having the requisite toughness and resistance to heat and wear.

All such inserts are preferably mounted with their cutting tips protruding slightly from the outer surface of the rolling cutter, but it is possible to so mount them that the cutting tips are flush with the cutter surface, or even recessed slightly inwardly therefrom. While the latter types are somewhat inefficient during a breaking-in period, the surrounding steel surfaces of the cutter body will be quickly worn away to expose the insert tips and allow them to contact the rock formation.

A jet piercer requires a considerable circulation of coolant to avoid the overheating and burning of its parts, and the reamers of the present invention are no exception to this rule. It will be apparent, however, that the customary open circulation system, in which the used coolant is discharged near the bottom of the hole, operates fundamentally at cross purposes with the principal mode of operation of a jet piercer. If enough coolant were circulated to the reamer to prevent *any* rise in its average temperature above that which would prevail in the absence of an operating burner (e.g., as in reaming an oil-well), the discharged coolant would entirely negate the heating effect of the burner and prevent it from operating. Accordingly, it is another general object of the present invention to furnish a reamer of the type thus far described which will operate at elevated temperatures to accomplish one or both of its bottom cutting and gage maintaining functions. Stated another way, such reamer will operate effectively without requiring excessive coolant. Kindred objects are to furnish such an effectively operating reamer despite the fact that the high temperature environment tends to soften the metal parts of the body, to decarburize the steel parts thereof, to cause rapid bearing wear, and to cause the wear resistant inserts to wallow in their sockets and fall out of the cutter before normal dulling.

The body of the reamer of the present invention is basically a relatively thick-walled shell disposed around the burner and functioning primarily to support the rolling cutters. This body is secured to and depends from the lower end of a hollow sub member through which fuel, oxidant, and coolant are supplied, both torque and weight being supplied to the reamer through such sub. In its preferred form, the interior surface of the reamer body is contoured to support the burner of the overall assembly against downward axial movement therefrom, and to form a longitudinally splined interfit with the outer surface of the burner to provide for common rotation and, more particularly, to definitely orient the flame ports of the burner between adjacent cutters of the reamer. In such preferred form, it has been found advantageous, from the viewpoint of ready assembly and disassembly, *not* to secure the burner to the reamer against reverse axial movement, and to provide a slip fit of the burner to a header secured to and depending from the sub member to supply the various fluids required by the burner, a fit in which the burner can move axially toward the sub to a limited extent in sliding and sealing engagement with the header.

The lower end of the reamer body is provided with at least one and preferably a plurality of circumferentially spaced recesses opening from the lower surface of the body, and in each recess a fixed cutter shaft or bearing pin is secured to the body so that it extends inwardly and downwardly toward the axis of rotation of the assembly, the bearing pin axis lying in or approximately in a vertical plane passing through the axis of the assembly as disposed for vertical drilling. When space permits, this shaft is preferably supported at both ends by the cutter body, as in the preferred embodiment described below, but it may also be supported in cantilever fashion with the fixed end secured to the body either at the inside or the outside of the reamer.

On each such shaft there is rotatably mounted an annular rolling cutter of generally frusto-conical shape, the cutter being mounted to roll against the bottom and revolve on its bearing pin as the assembly is rotated and weight is applied from above. The outer surface of each such cutter is divided into two general portions, a conical gage portion which rotates against the sidewall of the hole and a bottom cutting portion which contacts or overlies the bottom of the hole. At least one of the cutters has a heel row of circumferentially spaced (referring to the cutter's own axis) inserts mounted at the intersection of such portions of the surface at an acute angle with the gage portion so that the inner ends are spaced from both surface portions by the cutter metal and the outer, cutting ends rotate through a lowermost position in which they extend both downward to cut bottom and outwardly to engage the wall of the hole. Although additional rows of inserts may be located on the same cutter in sockets formed from the bottom cutting surface portion and spaced inwardly from such heel row, the present inventor has discovered that such additional inserts are unnecessary, even when the rock collar to be disintegrated extends inwardly to underlie the complete radial dimension of the cutter contour confronting bottom, and accordingly prefers only a heel row of inserts on each cutter.

The inserts used in such cutters are preferably of right cylindrical shape with flat inner ends and ovoid or hemispherical outer ends, although any reasonable cross-sectional shape and outer end shape may be used. The cylindrical shape with ovoid cutting tips is simple to fabricate and mount, and experience indicates that ovoid-ended inserts undergo less damage by chipping than do other inserts, e.g., those with one or more conical surfaces ending in a small flat at the extreme outer end. As will be brought out more fully below in connection with the specific description, another contribution of the present inventor was to make such inserts of greater length and to bury such increased length in deeper sockets than any heretofore used. The necessity for such contribution is again traceable to the high temperature environment, as the heat to which the reamer cutters are exposed apparently softens the metal bodies and causes them to loosen their grip on the inserts.

Another contribution of the present inventor was also brought about by the heated atmosphere in which the cutters operate, one which causes considerably accelerated bearing wear. Since the preferred embodiment uses only a heel row of inserts and the bottom cutting surface portion of the cutter is essentially blank, this surface portion could have any contour so long as it would not interfere with the rolling action of the cutter or the cutting action of the heel inserts and could be readily accommodated in the reamer body recess. In preferred form, this surface portion of the cutter body tapers inwardly from and with an opposite slope from that of the gage surface portion, terminating with a considerably smaller diameter than that at the heel of the cutter. This shape has been utilized in an "external bearing," one in which the nose portion of the cutter (i.e., the radially inward part of its bottom cutting surface) frictionally contacts a portion of the cutter body defining the recess in which the cutter is mounted. It had been found that such external bearing does not cause the cutter to drag and burn, as might be supposed, but that the cutter continues to rotate on its bearing pin with considerably reduced wear of its bearing pin and the contacting interior surface of the cutter.

The present invention will be better appreciated by conisdering the following description, considered together with the accompanying drawing, in which:

FIGURE 3A is a fragmentary sectional view of a cutter and the adjacent parts of a reamer which eliminates such distortions, and shows wear resistant inlays in the confronting bearing surfaces;

FIGURE 3B is similar to FIGURE 3A but shows the cutter mounted on a cantilever bearing pin;

FIGURE 11 shows an elevation of a jet piercer incorporating the present invention, as seen in a vertical section through a borehole when the tool is operating on a rock collar at the bottom of a blast hole; and FIGURE 11A is like FIGURE 11 but shows the present invention operating in a somewhat different situation, one in which the reamer prevents the formation of rock collars essentially only by maintaining gage of the borewall.

Figure 1:
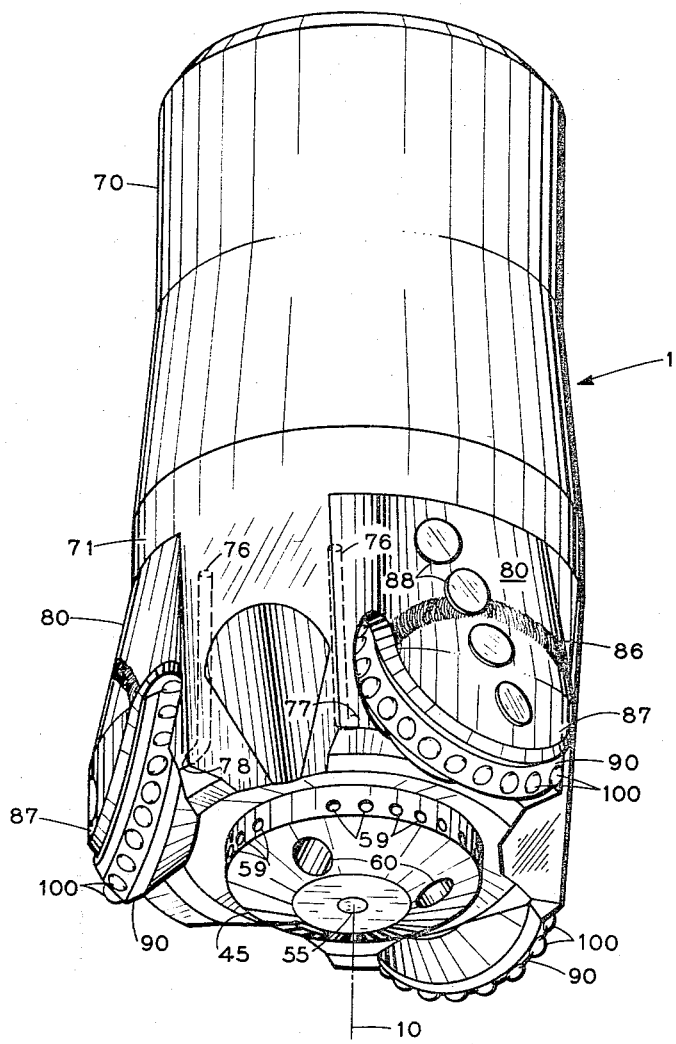
FIGURE 1 shows a preferred embodiment of the reamer of the present invention as assembled with a burner, a perspective exterior view from the bottom and a side showing only the discharge end of the burner.
Figure 3:
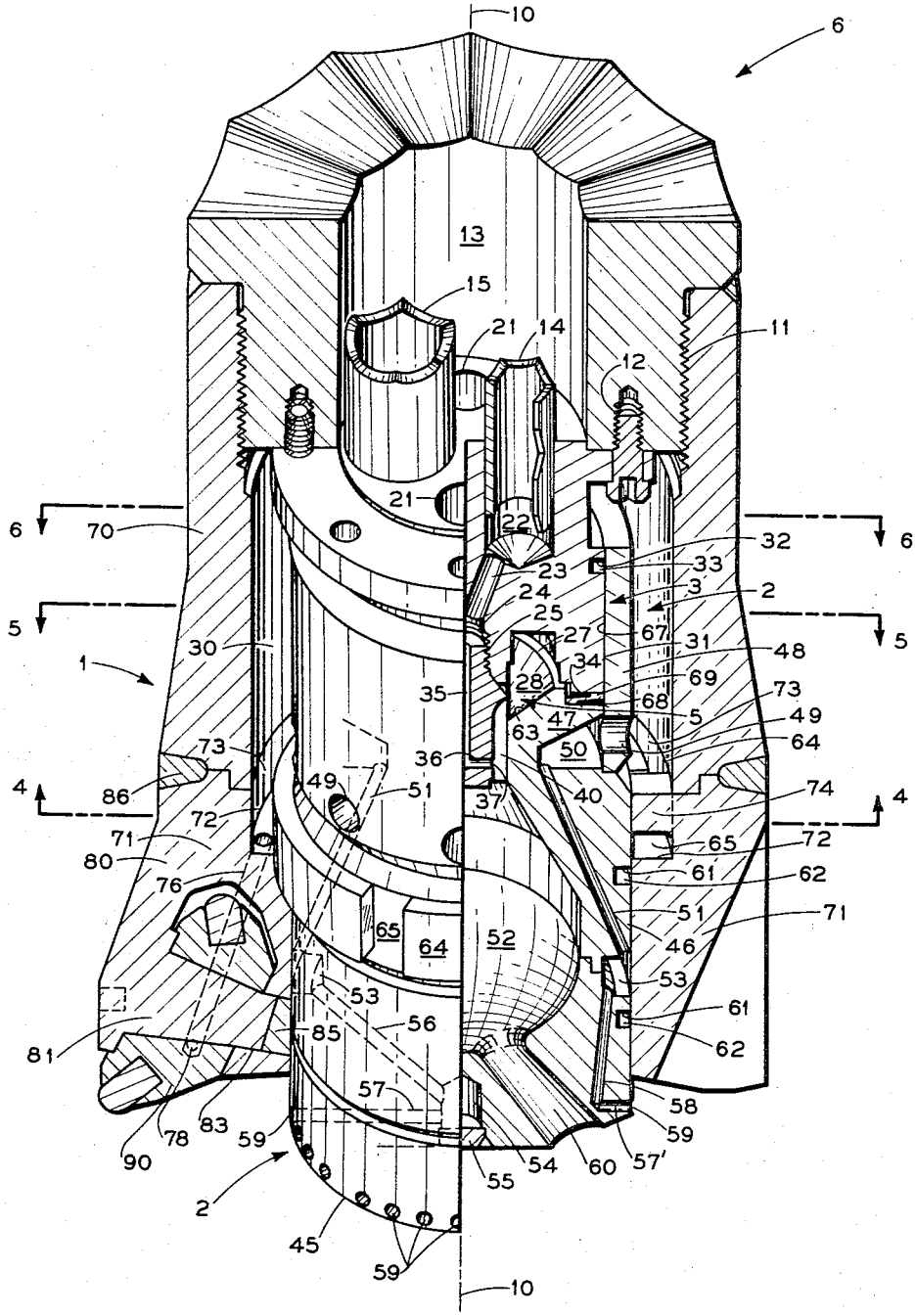
FIGURE 3 is a perspective view, partly in longitudinal section, of the jet piercer of FIGURE 1, the view of the sectioned members being taken as though such members were tilted and thereby introducing what appear to be distortions.
Figure 4:
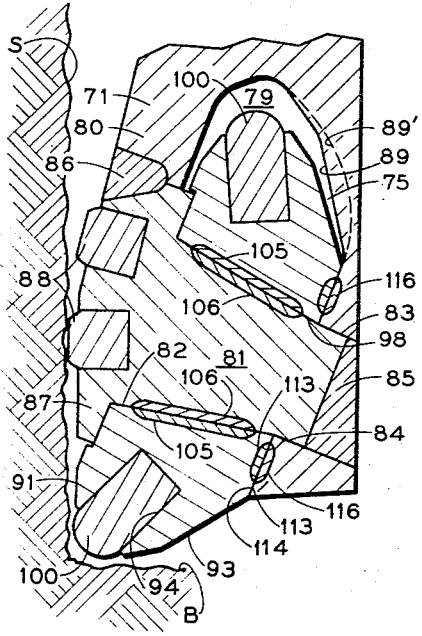
FIGURES 4, 5 and 6 are cross sections as indicated by the correspondingly numbered arrows of FIGURE 3.
Figure 4:
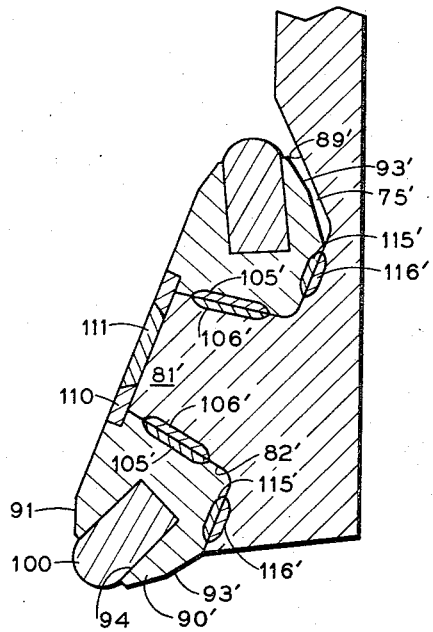
Figure 4:
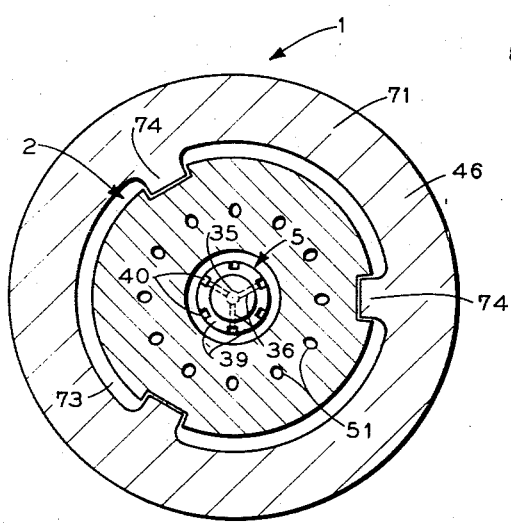
Figure 5:
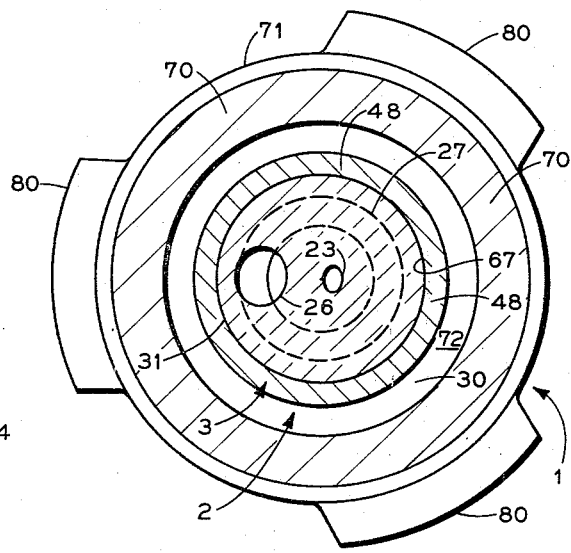
Figure 6:
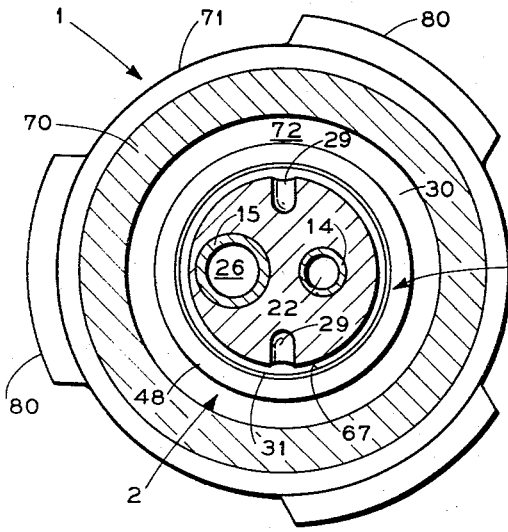

FIGURE 1 shows only the reamer 1 of the invention as it appears from the outside with the burner 2 supported inside the reamer, the other major components of the overall assembly being shown in FIGURE 3 and including header 3, injector 5, and the sub 6 which supports the total jet piercer. Reamer 1 is secured to sub 6 by threaded connection 11, while header 3 is secured to sub 6 by bolts 12. All fluids are supplied to the jet piercer through main passage 13, the fuel through conduit 14 and oxidant through conduit 15 while water flows through the remaining part of main passage 13 and into the two passages 21 opening through the top of header 3.

The following description of the internal parts and operation of the header, injector and burner are old in the art and constitute no part of the present invention. They are briefly described here to indicate the background for the invention and to furnish the reader an overall picture of the complete assembly, relieving him of the burden of referring to other published material for such information. Reference is made in particular to FIGURES 2, 3, 4, 5 and 6.

Header 3 contains interconnected axial fuel passageways 22 and 23, the former being connected to fuel conduit 14 and the latter to the opening 24 in the lower end of the header which accommodates injector 5 with a threaded connection 25. Also within the header (FIGURES 5 and 6) is the axial air or oxidant passage 26, connected at its upper end to air conduit 15 and at its lower end to the annular groove 27 in the bottom of the header and opening into the annular space 28 between header 3, injector 5 and the conical surface 63 of burner 2. The oxidant flows down conduit 15 and passage 26, around groove 27 and into space 28, then through the spaces 40 between longitudinal lands or splines 39 of the injector 5 and into combustion chamber 52 of the burner. The corresponding fuel flow is downwardly through conduit 14 and passages 22, 23 and 24, into the central axial passage 35 of the injector, then through radial passages 36 of the injector, mixing with the oxidant at ports 37 of radial passages 36 which intersect longitudinal grooves 40.

Figure 1A:
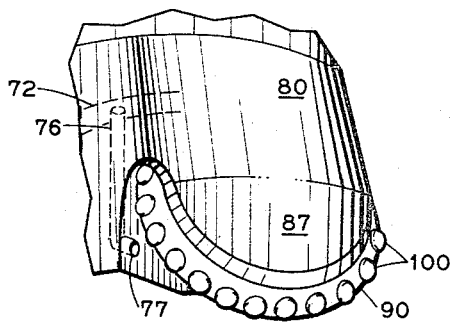
FIGURE 1A is a fragment of the FIGURE 1 embodiment viewed from a direction to show the location of a cutter cooling port.
Figure 2:
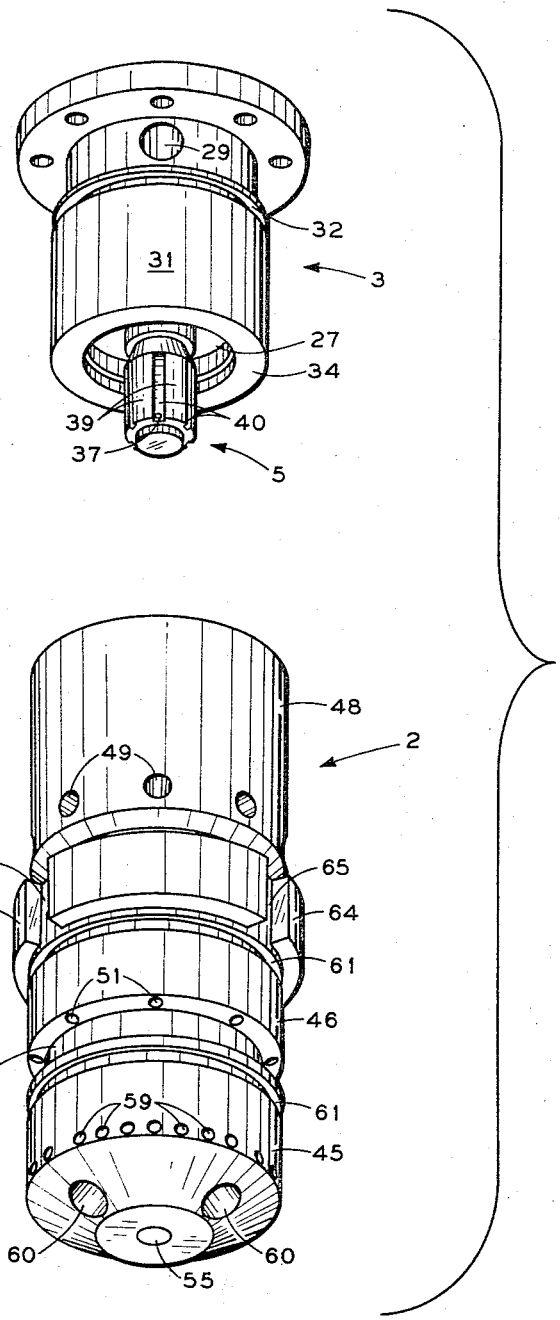
FIGURE 2 is a perspective exterior view of the burner of FIGURE 1 as removed from the reamer thereof.

Header 3 also distributes coolant to the burner and reamer, downwardly through axial water passages 21 and (FIGURE 6) outwardly through radial passages 29 to annular space 30 between header and reamer 1, the passages 21 and 29 being blind and intersecting at their bottoms. A portion of the water or other coolant flows from the lower end of space 30 through radial openings 49 in burner sleeve 48 to the annular space 50 within the burner, thence downwardly through inclined drilled passages 51 surrounding combustion chamber 52 and into the annular groove 53 in the outer surface of the burner and into the center distributing hole or well 54 at the orifice tip of the burner through inclined passages 56, such well being closed with a plug 55. From distributing hole 54, water is sprayed onto the lower end of each rolling cutter 90 through a multiplicity of passages 57 extending radially and somewhat upwardly to the outer surface of the burner, where they terminate in ports 59. The flanking pair of outer pasages 57' in each cluster of radial passages connect directly to annulus 53 via nearly vertical passages 58 rather than connecting to well 54. Some of the water, as indicated in FIGURES 1, 1A and 3, is also sprayed on the cutters 90 by passages 76 extending through reamer crown 71 from annulus 30 to ports 77 and 78 in the outer surface of the reamer.

Burner 3 consists of the integrally connected parts, proceeding from top to bottom, of sleeve 48, conical shell 47, main body 46 and orifice tip 45. In the orifice tip 45 is a multiplicity of flame ports or orifices 60, preferably three orifices shaped and inclined as illustrated and equally spaced with respect to axis 10 of the burner and other components. The outside surface of the burner also contains one or more annular grooves 61 to accommodate O-rings 62 to prevent the leakage of water between the burner and the reamer. The parts of the burner defining combustion chamber 52 must be formed of a very highly heat conductive metal, preferably a pure grade of copper, as combustion temperature are of the order of 5000–6000 degrees Rankine.

As mentioned above, the present invention contemplates a novel interfit of the components thus far described to one another and to the reamer 1. Heretofore the prior art assemblies were all rigidly assembled so that no relative movements, axial or circumferential, could take place between components, and the burner and reamer were both threadedly connected to the sub from which they were suspended. In the present invention the mismatching of flame port and rolling cutter locations, highly likely to occur with such threaded connections, is avoided by supporting the burner body inside the reamer with a slip fit and axial splining to the inner surface of the reamer body, together with a slip fit to the header. Such an interfitting also greatly facilitates assembly and disassembly, as the reamer may be screwed to the sub as tightly as necessary to insure a sound connection, and disassembly is accomplished simply by unscrewing such connection and lifting the burner out of the reamer.

Such arrangement can perhaps be seen best in FIGURE 3, which shows the ring 64 solidly secured to the outer surface of burner 2, such ring being interrupted by three equally spaced gaps 65. The outwardly projecting, flat lower surface of ring 64 is engaged by inwardly projecting annular shoulder 72 of the reamer to leave an annular space 73 contiguous with annulus 30 for the flow of water into passages 76. Three equally spaced lugs 74 solidly secured to reamer crown 71 and projecting inwardly through space 73 are designed and adapted to fit into the gaps 65 to provide a definitely oriented circumferential relationship between the burner and reamer, one in which each of flame ports 60 is spaced midway between each pair of adjacent cutters 90 and each cluster of coolant passageway ports 59 is centered on a cutter 90.

When the reamer and burner are assembled to sub 6, the upwardly extending sleeve 48 of the burner fits snugly and slidingly around the header 3, with the inner surface 67 of the burner engaging the outer surface 31 of header 3. The upper end of surface 31, remote from the higher temperatures, contains an annular groove 32 to receive an O-ring 33 to prevent the leakage of fluids between the members. Leakage is also minimized by virtue of the considerable axial length of the facing surfaces 67 and 31, defining a labyrinth seal. Optionally, an additional seal may be provided between the downwardly projecting annular boss 34 of the header and the corresponding annular groove 68 in conical portion 47 of the burner, e.g., the annular seal ring 69 illustrated. Seal ring 69, when used, is in the form of a metallic Belleville spring adapted to exrt a sealing force between the lower header surface of boss 34 and the horizontal burner surface defining groove 68. The relative widths of seal ring 69 and groove 68 are preferably selected so that there are radial gaps between the ring and the burner, both at the inside and outside diameters of the ring.

The other respects in which the present invention has provided an improved reamer are illustrated in the various drawing figures (other than 2, 4, 5, and 6). The body of reamer 1 consists of a lower portion or crown 71 and an upper portion or shank 70, the shank serving as the means for connecting the reamer to sub 6 and for spacing the cutters 90 axially with respect to orifice tip 45 of the burner. A multiplicity of circumferentially spaced legs 80 extend downwardly and somewhat outwardly from crown 71, and the crown is recessed between adjacent legs 80 to provide axial passages for ready upward flow of gases and entrained rock fragments. From each leg 80 a bearing pin 81 extends inwardly and somewhat downwardly toward the axis of rotation 10. A rotary cutter 90 is journaled on each bearing pin 81, and, see FIGURES 3 and 3A, the reduced diameter cylindrical portion 83 of the bearing pin is preferably supported in a recess 84 of crown 71. To complete the assembly, the bearing pin 81, originally a separate member, is welded to the crown at both ends, weldment 85 in recess 84 and weldment 86 at its outer end. The bearing surfaces of the bearing pin and cutter may taper slightly inwardly, as shown, or may be cylindrical or nearly cylindrical.

A journal bearing was selected for the cutter-bearing pin assembly for several reasons, the determining one being that such bearings permit the cutters mounted on them to operate effectively even after such pronounced wear of the contacting surfaces that the cutter fits very loosely on the pin. By contrast, attempts to use such anti-friction bearings as rollers and balls resulted in loss of the small members after such wear, causing the cutters to drag and be burned by the burner. The wear referred to takes place despite the use of hard metal inlay 105 on the bearing surface 93 of the cutter and hard metal inlay 106 on at least the pressure side (lower side) of bearing pin surface 82, and is probably accelerated by the high temperature environment. Wear resistant material to reduce thrust wear is preferably also added in the form of an inlay 115 in the end surface 113 of the cutter and an inlay 116 in the confronting annular surface 114 of reamer crown 71.

Figure 7:
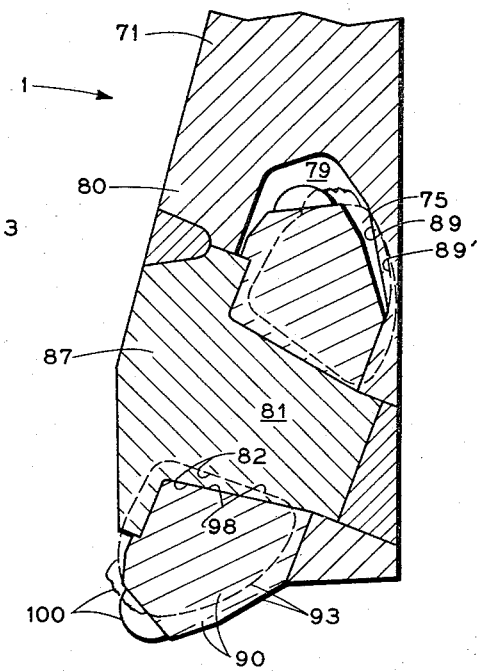
FIGURE 7 is a fragmentary section showing a cutter of the FIGURE 1 embodiment and the adjacent portions of the reamer body, and showing in particular the external bearing mentioned above.
Figure 8:
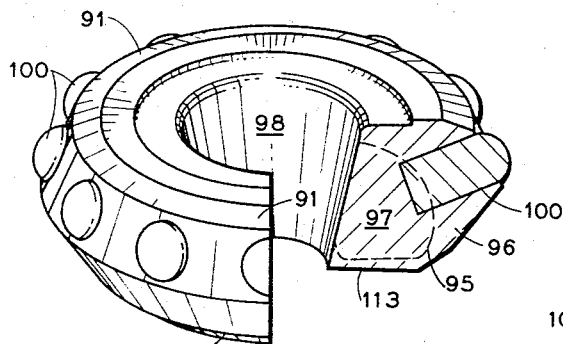
FIGURE 8 is a perspective external view of a cutter of the FIGURE 1 embodiment, this view having a quarter of the cutter cut away to show an insert mounted in a hole in the cutter shell and showing by dashed line the demarcation between an outer zone of the shell which is affected by the burner heat and an inner, unaffected zone.

Attention is now invited to the shape of cutter 90 and the number and disposition of the cutting inserts 100 secured in the cutter (see especially FIGURES 3A, 7, and 8). The cutter body is generally frusto-conical and has an outer periphery which consists essentially of a gage surface 91 at the backface and an inwardly tapering surface 93 at its smaller, inner end and nose, such two surfaces being joined by the indicated annular chamfer through which holes 94 are drilled to receive inserts 100. While inserts can be added in the small end of the cone to protrude from tapering surface 93, it has been found that such additional inserts are unnecessary and that all of the rock-removing work of the reamer is performed by the indicated row of heel inserts 100. These heel inserts are mounted with the indicated angular disposition to contact both the sidewall S and bottom B of a borehole, thus maintaining gage as well as cutting bottom. Additional inserts 88 in shirttail 87 protect the shirttail against erosion by upwardly moving rock particles.

In initial trials the heel inserts used were of the conventional lengths used in full hole rocks bits, and were seated in the cutter body with the conventional "square" ratio, i.e., so that the part of the insert length extending into the body was approximately equal to the insert diameter. Such inserts loosened rapidly and fell out. This presented a considerable problem, and attempts to retain the inserts by increasing the interference with the cone metal did not solve it. The present inventor postulated that at least the case of the cutter bottom was being softened by heat, as indicated by imaginary demarcation line 95 of FIGURE 8, to divide the cone into a heat affected outer zone 96 and a core 97 not affected by the ambient high temperatures. He then proposed to meet the problem by making sockets 94 and inserts 100 of sufficient length to bottom out in the non-affected zone 97, and this proposal was successful. However, it was not apparent to him without trial that the idea would work, as it was based on a supposition, and further required the use of inserts of 50% greater overall length than any heretofore used, e.g., $13/16$ inch long for $7/16$ inch diameter inserts, the longest previously known in such diameter being $17/32$ inch. Such longer inserts were secured in holes 94 so that $21/32$ inch extended into the cutter body, giving a seated-length-to-diameter ratio of 1.5. Such ratio can probably be varied from about 1¼ to 2 and higher. It could not be determined in advance that inserts of such length could be force fitted into their sockets, nor could it be known whether or not they would thereafter stand up in service until the fact was established by an actual reduction to practice.

FIGURE 7 illustrates the "external bearing" of the present invention, between the rotating external surface 93 of cutter 90 and the fixed surface 89 of reamer crown 71 which helps to define the pocket 79 which receives the cutter and shaft. Prototypes of the reamer of the present invention had a pocket of somewhat greater size, as indicated by phantom outline 89', as it was the prior art experience that any contact which created frictional drag on a rolling cutter tended to lock it to its bearing pin and cause it to drag on bottom, thus putting it out of service. It was found through actual field testing that after such prolonged use as to cause extensive wear on both bearing surface 98 of the cutter and the corresponding surface 82 of the bearing pin (the latter being almost entirely on the pressure side, i.e., the portion closest to the bottom of the hole), surface 93 of the cutter would come into rubbing contact with surface 89' of the crown without stopping the cutter from rotating. Thereafter and while such rubbing contact continued, there was negligible further wear of the design bearing, surfaces 82 and 98. This discovery was thereafter exploited by using the configuration shown in solid lines in FIGURE 7, as is more fully brought out in the example below. FIGURE 7 also shows by phantom outline the disposition of the cutter and the bearing surfaces after considerable wear in service.

FIGURE 3B shows an alternate embodiment in which a cantilever bearing pin 81' extends integrally from reamer crown 71 toward the outside of the hole, the bearing pin having a taper reversed to that of the FIGURE 3A embodiment and being unsupported at its outer end. The rolling cutter 90' of this embodiment is somewhat shorter than cutter 90 in its axial dimension in order to provide a thicker supporting leg for the bearing pin without increasing the overall radial dimension of the reamer, but is otherwise like that of FIGURE 3A. After assembling the cutter 90' on bearing pin 81', retaining ring 110 is inserted in the indicated registering grooves on the ends of both members and is welded to the bearing pin at 111 to secure the cutter in place. Hardfacing inlays 105' and 106' are preferably applied to the confronting journal bearing surfaces, and similar wear resistant inlays 115' and 116' in the thrust surfaces. An external bearing is introduced by providing a small gap 75' between surfaces 93' of the cutter and surface 89' of the reamer crown.

The main advantage of the FIGURE 3B embodiment lies in eliminating the shirttail 87 of the FIGURE 3A embodiment. This will avoid a source of trouble, as the shirttail is subject to abrasive wear and sometimes is worn away so rapidly as to cause the cutter to be lost before it is fully dulled. In the FIGURE 3A embodiment, it is necessary to use a multiplicity of inserts 88 in shirttail 87 to protect the shirttail against such abrasive wear. Such shirttail inserts are preferably flat-ended, as shown, to maximize the surface area of wear resistant material, and are also preferably disposed to shroud weldment 86 (see FIGURE 1), i.e., inserts 88 are so disposed that annular bands formed by projecting their rotating ends on the sidewall of the hole will completely cover a similar annular band formed by a like projection of the weldment.

It should also be noted that the reamer of the FIGURE 3A embodiment can be converted to one in which the bearing pin is supported only by leg 80, the inner end being free and the cutter being assembled to it at such inner end with a retaining ring, as in FIGURE 3B.

Figure 9:
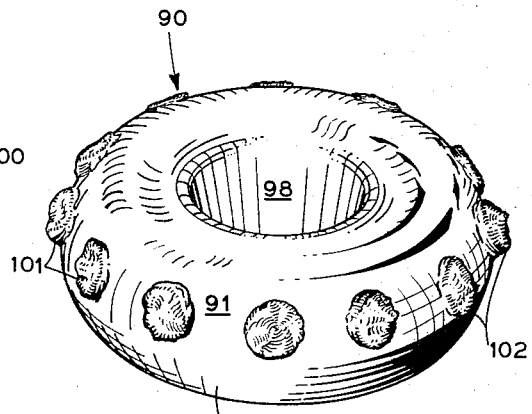
FIGURE 9 is a perspective external view of the cutter shown in FIGURE 8 after such cutter has experienced considerable wear in service, showing inserts with various wear patterns (all other views being of new components or assemblies)

FIGURE 9 illustrates some of the various wear configurations of the inserts used in the preferred embodiment (hemispherical cutting tips in new condition), including the flattened end shape 101 (with rounded edge) and the rather pointed wear shape 102. Since these inserts are not completely dulled and continue to cut rock, it is apparent that new inserts having the same end contours could be used from the outset.

Figure 10:
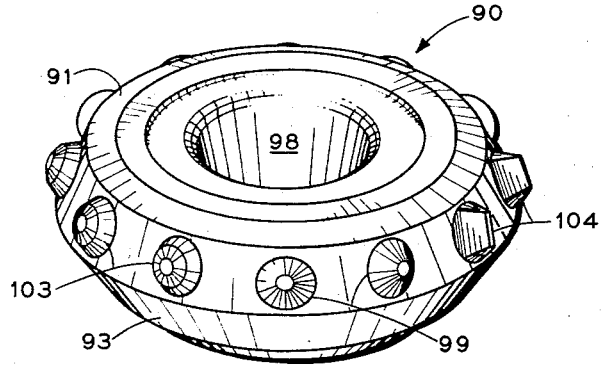
FIGURE 10 is another view similar to FIGURE 8, differing therefrom only in showing differently shaped blunt ends on the protruding portions of various inserts.

FIGURE 10 shows other inserts with other useful end shapes, including conical-ended inserts 99, doubly conical inserts with small flat ends 103, and those with chisel type ends 104. As previously indicated, such end shapes are all feasible, but the blunt shapes are preferred, in particular the previously described ovoid and hemispherical, because they are less likely to be split and fractured in service.

FIGURE 11 shows a complete jet piercer operating on the bottom B of a hole having a sidewall S. It should be noted that rock collar C extends radially inwardly to completely underlie cutter 90. Despite this fact, the single row of inserts 100 on each cutter disposed to cut the bottom of the hole adjacent the sidewall and simultaneously bear against the sidewall are adequate to disintegrate the entire collar.

FIGURE 11A shows the same assembly operating on a rock formation which requires the reamer to do little more than maintain the gage of the hole. The rock collar is very small and does not increase in size so long as the cutters 90 operate on sidewall S. This type of formation seems to disintegrate by cutter action well in advance of the rolling cutters.

*Example*

A bit of the preferred embodiment illustrated in the drawing and described above was made in 7⅞-inch diameter size with three rolling cutters equally spaced around the circumference of the burner and disposed so that the lowermost point through which the cutters rotate was disposed at an axial distance of ⅝ inch behind the lowermost surface of the burner. Each cutter was made of case hardened nickel alloy steel, and was of 3½ inches maximum outside diameter and its bearing surface 98 was 1 3/16 inches in length and 1⅜ inches in diameter at its larger end, tapering to ⅞ inch at its smaller end. The internal bearing between surface 98 and surface 82 of bearing pin 81 thus had an initial contact area of 1.37 inches (equal to length times average diameter). The insert holes were of 0.4375 inch diameter by 21/32-inch deep, 12 equally spaced holes being drilled so that the angle defined by each as it passes through the lowermost operating position illustrated was 45 degrees with the vertical axis of the hole. The inserts force fitted in these holes were of sintered tungsten carbide and had dimensions of 0.4390 inch diameter by 13/16-inch overall length, allowing 5/32-inch to protrude from the cutter surface when bottomed.

The bearing pins of the reamer were of nickel-chromium-molybdenum alloy steel hardfaced with iron-chromium-carbide alloy (as were the bearing surfaces on the cutters) and were disposed at an angle of 21 degrees with the horizontal plane normal to the axis of rotation. When the cutters and bearing pins were assembled to the crown of the reamer, the gap 75 (see FIGURES 3A and 7) between the external bearing surface 93 of the cutter 90 and surface 89 of the crown recess was 1/16-inch. After only a small amount of wear of the internal bearing surfaces 82 and 98, surfaces 93 and 89 were engaged in frictional contact to limit further wear of the internal bearing. The circumferential extent of gap 75 and surface 89 as newly assembled was 120 degrees and the linear cross-sectional dimension of the contacting surfaces was ¾-inch, so that the initial contact area was 1.87 square inches. This area thereafter increased as much as 50% as wear progressed during the service life of the reamer.

No particular pains were taken with respect to preparing surfaces 93 and 89 of the external bearing, nor were the underlying materials of special composition. It is possible that the wear rate of these surfaces would be decreased somewhat by inlays of hardfacing. The use of additional inserts protruding from surface 93 would destroy such an external bearing, as the compacted tungsten carbide would rapidly (and wastefully) destroy the steel, but such result could perhaps be avoided by providing an inlay of tungsten carbide to define surface 89.

This reamer was assembled to a burner of the type described, and the reamer was then threaded to a sub having a header which made a sliding fit with the burner as set forth above. Only three of the described cooling passages 76, ¼-inch in diameter, were used, the others being plugged so that each cutter had water sprayed on it on one side, the leading side of the cutter. The corresponding coolant passages 57 and 57′ in the burner orifice tip had a diameter of $\frac{5}{32}$-inch.

The assembled jet piercer was employed in drilling blast holes in an iron ore mine located near Hoyt Lake, Mich., the formation being taconite and cherty flint containing various intrusives. The jet piercer was rotated at 15 revolutions per minute while being supplied with 270 pounds of fuel oil (diesel oil) per hour and 10,000 cu. ft. of oxygen per hour. Cooling water was supplied at the rate of 1100 gallons per hour, of which approximately 235 gallons per hour went directly to the cutters and the balance to the burner. A weight of only 1050 pounds was applied to the reamer throughout the run.

This assembly made 1948 feet of hole before the reamer was completely dulled and had to be discarded. At that time one cutter had broken off, two inserts had been lost from a second cutter, and a section was burned out of the third. There was considerably erosive wear of the shirttails throughout the run, and at four different stages prior to complete dulling additional hardfacing was welded to the outer surface to replace eroded areas. The total time consumed in the run (actually a series of runs, as blast holes are only of 40 to 60 feet in depth) was 130.6 hours, making an average drilling rate of 14.5 feet per hour.

In a second run, the same type assembly was used, differing from the above only in that the watercourse leading directly through the reamer body to each cutter was of ⅛-inch diameter. Taconite containing instrusives was drilled in an iron ore mine near Babbitt, Minn., again for blasting. The jet piercer was supplied with 320 pounds of fuel oil per hour, 12,000 cu. ft. of oxygen per hours, and 1100 gallons of water per hour. The ortary speed was again 15 r.p.m., and the weight on the tool 1050 pounds.

In the second run, the tool made 2082 feet of hole in 105.6 hours, an average drilling rate of 19.4 feet/hour, before the reamer was completely dulled, at which time one cutter had broken off. Again there was considerable shirttail wear and additional hardfacing was welded on to replace eroded shirttail material.

What is claimed is:

1. A rolling cutter for a jet piercer reamer comprising a body having a pair of integrally connected, oppositely extending, generally conical portions symmetrical about a common axis and each converging toward said axis from a common base, said body having a circumferential row of axially elongated wear resistant inserts secured in sockets formed from the outer surface of said body proximate said common base and extending into said body between said conical portions to a depth greater than about 1¼ times the diameter of said wear resistant inserts, said inserts having outer cutting tips protruding from the body at said common base.

2. A jet piercer reamer comprising a crown with at least one cutter recess in its lower end, a bearing pin secured to said crown and extending inwardly and downwardly toward the axis of said crown, and a generally frusto-conical rolling cutter rotatably mounted on said bearing pin, said rolling cutter having a body with a gage surface portion and a bottom cutting surface portion and cutting structure concentrated proximate the intersection of said portions, the radially inward or nose part of said bottom cutting surface being a smooth surface of revolution and a portion of said crown defining the upper and inner part of said cutter recess having a like surface of revolution facing said nose surface across a small gap, whereby an external bearing is formed between said facing surfaces after a small amount of initial wear of the bearing pin and corresponding internal bearing surface of the cutter which limits further such wear.

3. An external bearing between a portion of the outer surface of a rolling cutter and the body of a rotary earth penetrating tool, said tool having a cutter recess in its lower end and a bearing pin secured in said recess and inclined inwardly and downwardly toward the axis of rotation of said tool, said rolling cutter being rotatably mounted on said bearing pin and being rotatable through said recess to define large clearances between all cutting structure extending from the cutter and the adjacent portions of the tool body and a very small gap between a smooth portion of the cutter and a corresponding smooth adjacent portion of the tool body, said smooth portions of the cutter and tool body being in the form of surfaces of revolution forming said external bearings, said gap being of smaller radial extent than said clearances.

4. A rotary reamer for a vertically oriented and elongated rotary blowpipe burner having a plurality of circumferentially spaced flame ports at its lower end and means at its upper end for receiving a flowing fuel and a flowing oxidant, said reamer comprising a sleeve type body with an inner periphery shouldered and splined to receive and support said burner against vertical downward movement and rotary movement relative to said reamer body, said body having an upwardly extending shank at its upper end adapted for rigid connection to a sub member and a multiplicity of cutter recesses in its lower end, said cutter recesses being circumferentially spaced between the flame ports of the burner, a bearing pin secured to the reamer body in each said recess and extending radially inwardly and downwardly toward the axis of rotation of said burner, and a rolling cutter rotatably mounted on each said bearing pin, said rolling cutter having cutting structure thereon in the form of wear resistant inserts secured in holes formed from the outer surface of said cutter with blunt tips approximately protruding from the cutter surface and adapted to cut at least that portion of a rock formation at the bottom of a borehole adjacent the sidewall of such borehole and simultaneously to maintain the gage of said borehole.

5. A rotary reamer adapted to be assembled to and around a burner of a jet piercer for common rotation and axial advance therewith, said rotary reamer having a sleeve-like body with an upper end adapted for secure connection to a sub member used to transmit torque and vertical loading and a lower end containing a multiplicity of circumferentially spaced recesses, a bearing pin secured to said body in each said recess with its axis extending radially inwardly and somewhat downwardly toward the axis of rotation of said burner and reamer, and a rolling cutter rotatably mounted on said bearing pin, said rolling cutter being generally frusto-conical and comprising a body with an outer surface having a gage portion and a bottom cutting portion, and cutting structure on at least one of said cutters consisting only of a row of heel inserts secured in spaced holes formed in the cutter from its outer surface between said gage and bottom cutting portions and inclined with respect to said gage portion, said holes and inserts extending deeply into said cutter and having blunt cutting tips protruding therefrom, the bottom cutting portion of said surface tapering to a smaller radius toward the inner end of the cutter and said recess having a portion of its surface at the inner and upper part of the recess confronting said bottom cutting portion of the cutter surface across a small gap to form an external bearing.

6. A jet piercer comprising a burner having a longitudinal axis of rotation and mountable with said axis in a vertical orientation so that fluid fuel and fluid oxidant are delivered to its upper end and the products of combustion are delivered through its lower end, together with a rolling cutter reamer disposed around the outer surface of said burner and having a plurality of circumferentially spaced rolling cutters mounted thereon and adapted to cut an annular portion of a borehole lying outside of the bottom area directly below said burner and adjacent the sidewall of said borehole and also to maintain the gage of said sidewall, the cutting structure of said cutters being of the type wherein compacted inserts of cemented wear resistant material are secured in holes drilled in the outer surfaces of the cutters and including at least a row disposed to rotate through a lowermost position in which they are disposed at an acute angle with respect to said sidewall while simultaneously contacting both sidewall and bottom of the hole, said burner having a number of circumferentially spaced flame ports in its lower end and a radially outwardly extending downwardly facing shoulder on its outer periphery, said reamer having a corresponding radially outwardly extending, upwardly facing shoulder on its inner periphery to engage said burner shoulder and support the burner against downward axial movement, said inner periphery of the reamer and outer periphery of the burner being provided with splines on one of them and corresponding grooves on the other receiving said splines to prevent relative rotation between burner and reamer, said splines and grooves being disposed to orient each said flame port between adjacent rolling cutters, said reamer having an upwardly extending shank adapted to form a secure connection to a sub and said reamer having an upwardly extending portion adapted to slidable and sealingly engage a header means depending from said sub inside said reamer shank to supply said fuel and oxidant.

7. Apparatus for thermal mechanical piercing an elongated vertical hole in a mineral body which comprises a burner having flame ports, a reamer crown surrounding said burner and having cutter recesses in its lower end, said recesses being disposed above said flame ports and circumferentially spaced between them, and planetary roller cutters journaled on axles secured to said crown and disposed in said recesses said cutters having bodies each with an exterior surface having a gage portion and a bottom cutting portion, said cutters being disposed between said flame ports and having cutting structure in the form of inserts of wear resistant material secured in holes formed deeply into the cutter bodies from its outer surface so that a portion of each said insert approximately protrudes from the cutter, said inserts being disposed in spaced apart relationship in a circumferential heel row, the hole for each such heel insert being formed at an angle between said gage and bottom cutting portions of the body surface so that the insert secured therein will contact the formation being pierced both at the bottom of the hole and at the sidewall of such hole, said holes for the inserts being greater in depth than the diameter of the inserts, the radially inward or nose part of said bottom cutting portion of the exterior cutter surface being a smooth surface of revolution and a portion of said crown adjacent said recess having a like surface of revolution and facing said nose of the cutter across a small gap, whereby an external bearing is formed between said surfaces of revolution after a small amount of initial wear between said axle and the corresponding internal bearing surface of said cutter.

References Cited
UNITED STATES PATENTS

| | | | |
|---|---|---|---|
| 1,792,927 | 2/1931 | Reed | 175—343 X |
| 2,121,202 | 6/1938 | Killgore | 175—374 |
| 2,774,570 | 12/1956 | Cunningham | 175—374 |
| 2,886,293 | 5/1959 | Arnold | 175—14 |
| 3,134,447 | 5/1964 | McElya | 175—374 X |
| 3,182,734 | 5/1965 | Scott | 175—15 X |
| 3,212,592 | 10/1965 | Rolseth | 175—14 |

CHARLES E. O'CONNELL, *Primary Examiner.*

ERNEST R. PURSER, NILE C. BYERS, *Examiners.*